United States Patent
Wachob et al.

(10) Patent No.: US 10,735,822 B2
(45) Date of Patent: Aug. 4, 2020

(54) SYSTEM AND METHOD FOR PROVIDING DATA COMMUNICATION SERVICES THROUGH A CATV TAP-OFF DEVICE

(71) Applicant: Antronix Inc., Cranbury, NJ (US)

(72) Inventors: David Wachob, New Hope, PA (US);
Neil Tang, Marlboro, NJ (US)

(73) Assignee: Antronix Inc.

( * ) Notice: Subject to any disclaimer, the term of this patent is extended or adjusted under 35 U.S.C. 154(b) by 63 days.

(21) Appl. No.: 15/715,597

(22) Filed: Sep. 26, 2017

(65) Prior Publication Data

US 2018/0020261 A1 Jan. 18, 2018

Related U.S. Application Data

(63) Continuation-in-part of application No. 15/398,058, filed on Jan. 4, 2017, now Pat. No. 9,930,421, which
(Continued)

(51) Int. Cl.
*H04N 7/173* (2011.01)
*H04N 21/61* (2011.01)
(Continued)

(52) U.S. Cl.
CPC ........... *H04N 21/615* (2013.01); *H04N 7/104* (2013.01); *H04N 7/12* (2013.01); *H04N 7/17354* (2013.01);
(Continued)

(58) Field of Classification Search
CPC .... H04N 21/426; H04N 21/2221; H04N 7/10; H04N 7/12; H04N 21/6118; H04N 7/102; H04N 7/104; H04N 7/17309
(Continued)

(56) References Cited

U.S. PATENT DOCUMENTS 4,652,862 A * 3/1987 Verslycken ............. E05B 47/00
109/21
5,765,099 A 6/1998 Georges et al.
(Continued)

FOREIGN PATENT DOCUMENTS

WO 0022821 4/2000
WO 2013108938 7/2013

OTHER PUBLICATIONS

Using WiPNET to Connect the Home With the Existing COAX Network, Interview with Adam Lenio. Feb./Mar. 2012.
(Continued)

*Primary Examiner* — Annan Q Shang
(74) *Attorney, Agent, or Firm* — The Belles Group, P.C.

(57) ABSTRACT

In one embodiment, a system for providing data communication services includes a cable television (CATV) tap operably coupled to a CATV network, the CATV tap comprising a tap transceiver. Further, a CATV gateway device is operably coupled to the CATV tap and includes a gateway modem using a first communications standard to communicate with the CATV network, and a gateway transceiver operably coupled to the gateway modem and configured to communicate with the tap transceiver. The system further includes a first device operably coupled to the CATV tap and configured to send or receive device data. The device data includes control data for controlling the first device or monitoring data generated by the first device. The tap transceiver of the CATV tap is configured to communicate the device data between the first device and the gateway transceiver.

19 Claims, 12 Drawing Sheets

Related U.S. Application Data is a continuation of application No. 14/309,805, filed on Jun. 19, 2014, now Pat. No. 9,554,194.

(60) Provisional application No. 61/960,767, filed on Sep. 26, 2013, provisional application No. 61/956,907, filed on Jun. 20, 2013.

(51) Int. Cl.
| | | |
|---|---|---|
| *H04N 21/222* | (2011.01) | |
| *H04N 7/12* | (2006.01) | |
| *H04N 7/10* | (2006.01) | |
| *H04N 21/426* | (2011.01) | |

(52) U.S. Cl.
CPC ....... *H04N 21/2221* (2013.01); *H04N 21/426* (2013.01); *H04N 21/6118* (2013.01); *H04N 21/6168* (2013.01); *H04N 7/10* (2013.01)

(58) Field of Classification Search
USPC .......................................... 725/127, 133, 149
See application file for complete search history.

(56) References Cited

U.S. PATENT DOCUMENTS

| | | | | |
|---|---|---|---|---|
| 6,714,534 B1* | 3/2004 | Gerszberg | ............ | H04Q 3/0016 370/352 |
| 6,839,829 B1* | 1/2005 | Daruwalla | .......... | H04L 12/2801 348/E7.07 |
| 6,915,530 B1* | 7/2005 | Kauffman | .............. | H04N 7/102 348/E7.052 |
| 7,139,923 B1* | 11/2006 | Chapman | ............. | H04J 3/0664 713/400 |
| 7,260,654 B1* | 8/2007 | Satapathy | ........... | H04L 12/2856 348/E7.069 |
| 8,370,886 B2 | 2/2013 | Karpati et al. | | |
| 8,498,294 B1* | 7/2013 | Monk | ................. | H04L 12/2801 370/392 |
| 9,113,187 B2* | 8/2015 | Conroy | .................. | H04N 21/41 |
| 2002/0095498 A1 | 7/2002 | Chanda et al. | | |
| 2003/0045284 A1 | 3/2003 | Copley et al. | | |
| 2003/0046706 A1* | 3/2003 | Rakib | ..................... | H04L 45/10 725/111 |
| 2003/0106067 A1* | 6/2003 | Hoskins | ............. | H04L 12/2801 725/119 |
| 2004/0131357 A1* | 7/2004 | Farmer | ............... | H04J 14/0252 398/67 |
| 2004/0248595 A1* | 12/2004 | Hicks, III | ............. | H04W 88/06 455/465 |
| 2006/0262913 A1* | 11/2006 | Cook | ...................... | H04M 1/57 379/88.19 |
| 2006/0269285 A1* | 11/2006 | Farmer | .................... | H04N 7/22 398/72 |
| 2007/0019959 A1* | 1/2007 | Retnasothie | ..... | H04B 10/25752 398/115 |
| 2007/0118859 A1 | 5/2007 | Tsukahara et al. | | |
| 2007/0133425 A1* | 6/2007 | Chappell | ................. | H04L 43/00 370/250 |
| 2009/0150943 A1* | 6/2009 | Vasudevan | ......... | H04N 21/2385 725/86 |
| 2010/0054751 A1* | 3/2010 | Murry | ................. | H04J 14/0206 398/137 |
| 2010/0281508 A1* | 11/2010 | Poder | ............... | H04N 21/23106 725/93 |
| 2011/0113156 A1* | 5/2011 | Li | ...................... | H04L 47/2491 709/248 |
| 2011/0193701 A1 | 8/2011 | Hanft | | |
| 2011/0314492 A1 | 12/2011 | Cassidy et al. | | |
| 2013/0061276 A1* | 3/2013 | Urban | ................ | H04N 21/6118 725/109 |
| 2013/0070640 A1* | 3/2013 | Chapman | ............ | H04L 12/2801 370/254 |
| 2013/0081096 A1* | 3/2013 | Wells | ................... | H04L 12/2801 725/120 |
| 2013/0276047 A1* | 10/2013 | Chapman | ........... | H04N 21/6543 725/111 |
| 2013/0322504 A1 | 12/2013 | Asati et al. | | |
| 2014/0254392 A1* | 9/2014 | Wolcott | ............... | H04B 17/345 370/242 |
| 2014/0267931 A1* | 9/2014 | Gilson | ................. | H04N 5/4403 348/734 |
| 2014/0287760 A1* | 9/2014 | Spinelli | ................. | H04W 76/12 455/437 |
| 2014/0334288 A1* | 11/2014 | Hong | ................... | H04L 12/6418 370/216 |
| 2014/0344874 A1* | 11/2014 | Olsen | ................... | H04N 17/004 725/107 |
| 2015/0181442 A1* | 6/2015 | Zinevich | ............... | H04J 11/0023 455/424 |
| 2015/0288457 A1* | 10/2015 | Schemmann | ............ | H04N 7/22 398/194 |
| 2016/0353163 A1* | 12/2016 | Bentley | ................ | H04N 21/442 |

OTHER PUBLICATIONS

Introduction to in-Building Wireless Signal Distribution for Public Safety, 2005-2007. Jack Daniel Company.
WAP-001 In Wall Access Point Description, www.handlink.com, 2012.
Wifi Tap-Off, Netwave Co., Ltd., May 2010.

\* cited by examiner

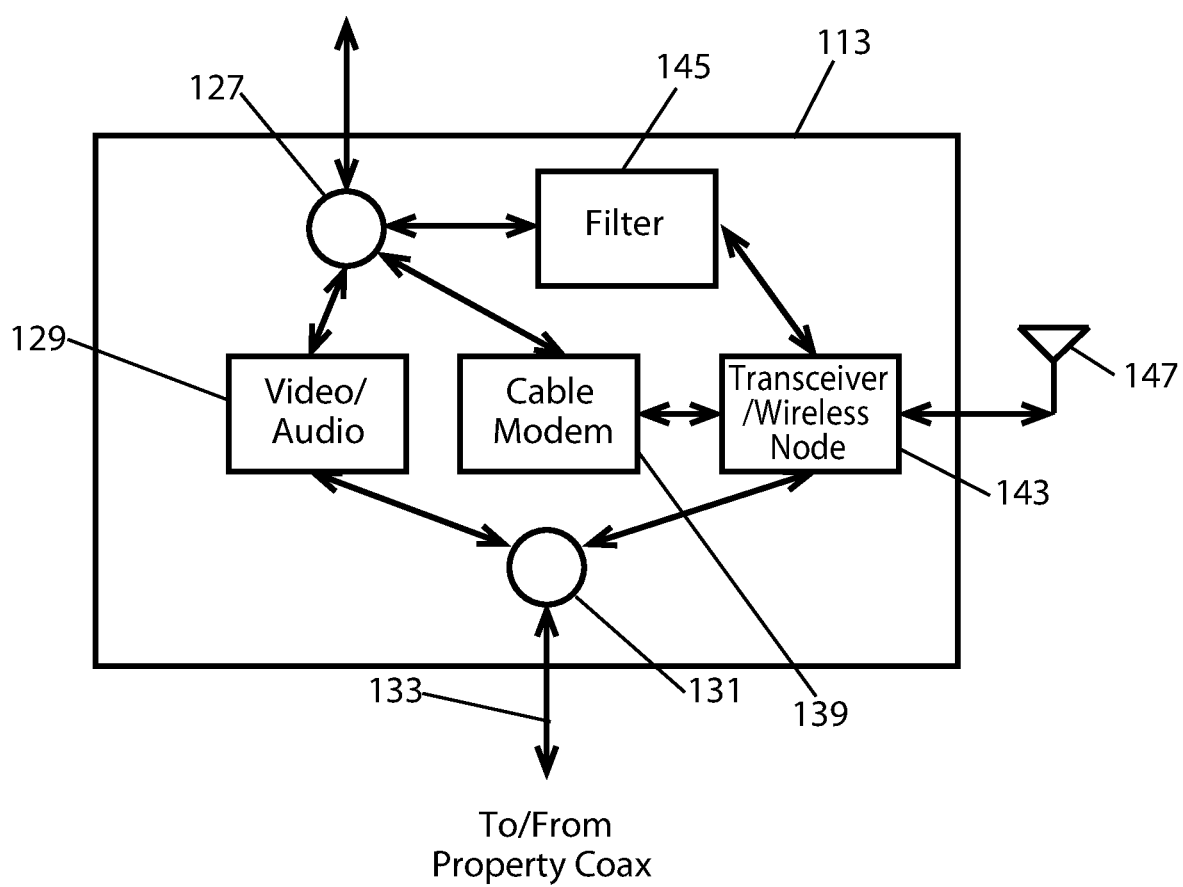

SYSTEM AND METHOD FOR PROVIDING DATA COMMUNICATION SERVICES THROUGH A CATV TAP-OFF DEVICE

CROSS REFERENCE TO RELATED APPLICATIONS

The present application is a continuation in part of U.S. patent application Ser. No. 15/398,058, filed Jan. 4, 2017, which is a continuation of U.S. patent application Ser. No. 14/309,805, filed Jun. 19, 2014, which claims the benefit of U.S. Provisional Application No. 61/956,907, filed Jun. 20, 2013, and U.S. Provisional Application No. 61/960,767, filed Sep. 26, 2013. The disclosures of the aforementioned priority applications are incorporated herein by reference in their entirety.

FIELD OF THE INVENTION

The field of the present invention relates to systems and methods for providing data communication services through a cable television (CATV) tap-off device.

BACKGROUND OF THE INVENTION

A CATV network generally provides data services, for both residential and commercial purposes, that include both broadcast audio and video (i.e., television) programming and data services by providing access to the CATV network through a CATV tap-off device. The CATV tap-off device is frequently located near the perimeter of a property so that the cable service provider has easy access to the device. Since most CATV networks are generally connected to other public networks, such as the Internet, properties are able to enjoy wide-ranging data services through the network connection provided through the CATV tap-off device. The network service from the CATV tap-off device may be extended into a building on a property by installation of equipment for a local area network (LAN). In addition, wireless networking devices, such as WiFi devices, may be incorporated into the LAN to facilitate access to the network.

It can be advantageous to control a wide variety of functionality and information flow at a CATV tap. There is need for an improved approach to enabling such control and functionality in the tap.

SUMMARY OF THE INVENTION

The present invention is directed toward a system and method for providing data communication services through a CATV tap. In a first aspect, a system comprises a cable television (CATV) tap operably coupled to a CATV network, the CATV tap comprising a tap transceiver; a CATV gateway device operably coupled to the CATV tap and comprising a gateway modem using a first communications standard to communicate with the CATV network; and a gateway transceiver operably coupled to the gateway modem and configured to communicate with the tap transceiver; and a first device operably coupled to the CATV tap and configured to send or receive device data, the device data comprising control data for controlling the first device or monitoring data generated by the first device; wherein the tap transceiver of the CATV tap is configured to communicate the device data between the first device and the gateway transceiver.

In another aspect, a CATV tap comprises a tap transceiver configured to operably couple to a CATV gateway device in communication with a CATV network; wherein the tap transceiver and the gateway device communicate using a transceiver frequency band that is non-overlapping with a frequency band used to send CATV signals over the CATV network; and wherein the first device is configured to send or receive the device data, the device data comprising control data for controlling the first device or monitoring data generated by the first device.

In another aspect, a method includes operably coupling a cable television (CATV) tap to a CATV network, the CATV tap comprising a tap transceiver; operably coupling a CATV gateway device to the CATV tap, the CATV gateway device comprising a gateway modem using a first communications standard to communicate with the CATV network; and a gateway transceiver operably coupled to the gateway modem and configured to communicate with the tap transceiver; operably coupling a first device to the CATV tap, the first device configured to send or receive device data, the device data comprising control data for controlling the first device or monitoring data generated by the first device; and via the tap transceiver of the CATV tap, communicating the device data between the first device and the gateway transceiver.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 2A is a schematic diagram showing a gateway device for the system of FIG. 1;

DETAILED DESCRIPTION OF THE INVENTION

Figure 1:
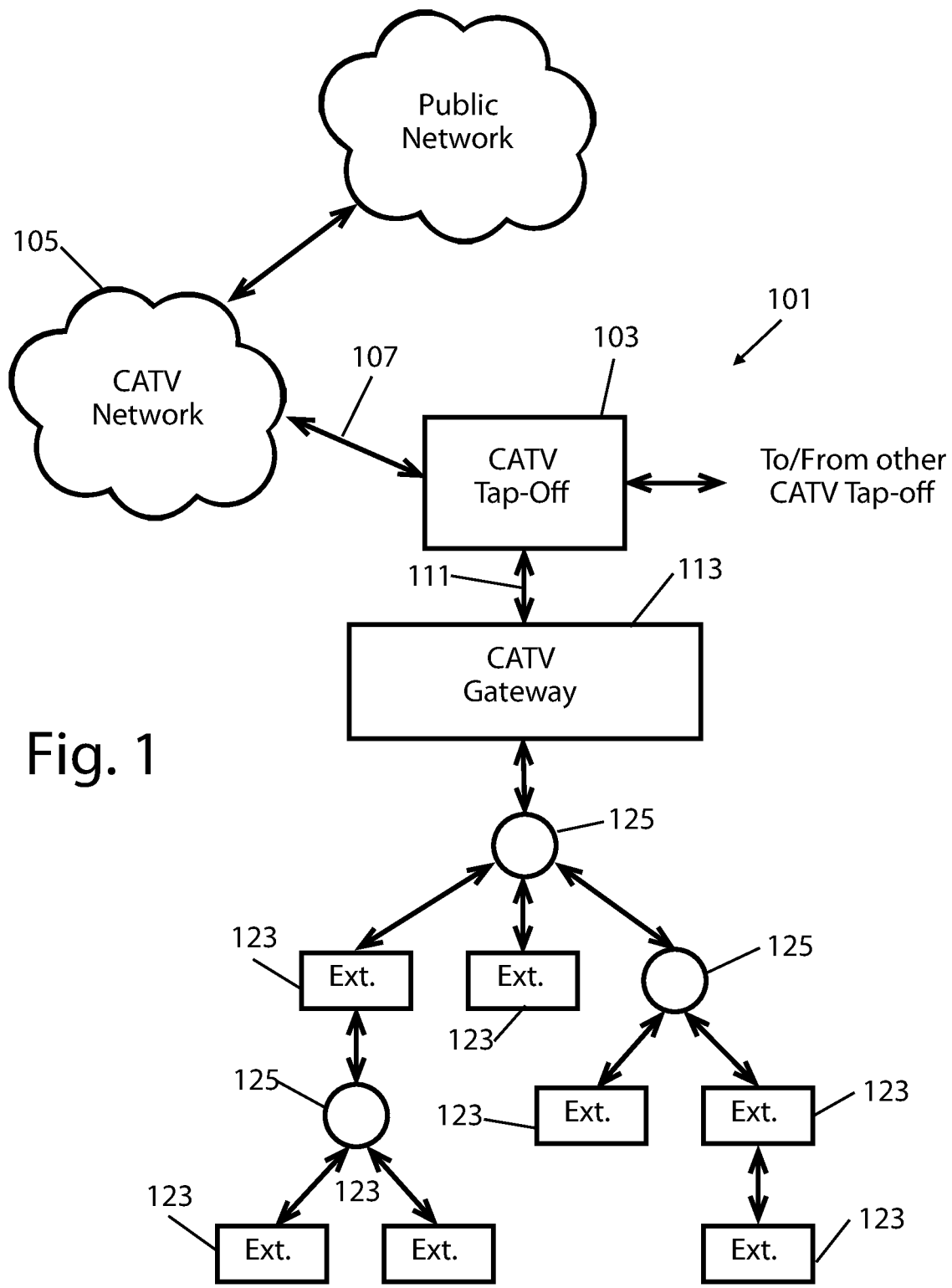
FIG. 1 is a schematic diagram showing a first system for providing data services through a CATV tap-off device.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e g, internal/external hard disks, floppy discs, magnetic tape CD-ROM, DVD-ROM, optical disk, ZIP™ drive, Blu-ray disk, and others), which may be written to and/or read by a processor operably connected to the medium.

In the following description and figures, where parts of the system are schematically shown and described as individual functional blocks (e.g., a filter, a mixer, a splitter, a transceiver, etc.), one of ordinary skill in the art will recognize that the functions of any one individual block may be integrated with the functions of one or more other individual blocks for purposes of implementation. For example, a filter may be integrated with a mixer or with a transceiver for a particular implementation. Those of skill in the art will recognize that several of the functional blocks may be integrated according to design choice.

Turning in detail to the drawings, FIG. 1 shows a first system 101 for providing data services through a CATV tap-off device 103. The CATV tap-off device 103 is connected to the CATV network 105 through a network coaxial cable 107 for receiving a CATV signal. The network coaxial cable 107 may terminate at the CATV tap-off device 103, or it may pass through the CATV tap-off device 103 to provide the CATV signal to additional CATV tap-off devices (not shown). The CATV tap-off device 103 is connected through a gateway coaxial cable 111 to the CATV gateway device 113, which is placed at the point of entry for the property, which may be on the property, generally on the exterior of a building or structure, to provide easier access for service calls, or within a building or structure. The CATV tap-off device 103 may be connected to a number of additional CATV gateway devices, whether those additional CATV gateway devices are placed on the same property or on other properties. For purposes of the discussion below, unless otherwise noted, each additional CATV gateway device operates in the same manner, with the same functionality.

The incoming CATV signal is split off from the main CATV signal at the CATV tap-off device 103 and passed to the CATV gateway device 113 and is used to provide both a broadcast audio and video services signal and a data services signal to the property. Although typically broadcast audio and video services signal is sent over the CATV network 105, and thus to the CATV tap-off device 103 as a form of data signal, the two types of data signals are typically viewed as being distinct within the industry and treated differently for delivery to the end user, and so they are differentiated here as well. For example, the broadcast audio and video services signal is typically directed toward a set-top television device, or to a television itself, when the television is fitted with an appropriate cable television decoder, and the data services signal is split from or filtered out of the incoming CATV signal so that the broadcast audio and video services signal may be used to create a visual and audio display on the television. On the other hand, the data services signal is typically directed first to a cable modem, and from there to one or more computing devices (e.g., a server, a personal computer, a smart phone, and the like), and the broadcast audio and video services signal is split from or filtered out of the incoming CATV signal so that the data services signal may be utilized by the cable modem. The manner in which the different parts of the incoming CATV signal are processed are well known to those of skill in the art, and thus such signal processing details are not addressed in detail.

The data services provided to a property may utilize any combination of wired (e.g., coaxial cable, Ethernet, and the like) or wireless WiFi, and the like) technologies to distribute the network throughout a property. However, as will be discussed in further detail below, the CATV gateway device 113 and coaxial cable lines throughout the property and/or structure may be utilized to distribute the data services signal throughout the property and/or structure, thereby enabling, data services throughout the property and/or structure. This is done by communications between the CATV gateway device 113 and one or more extension devices 123 over the coaxial cable lines on the property and/or within the structure. Where multiple extension devices 123 are used, as shown in FIG. 1, data services may be created on the property having a tree structure, by connecting one or more extension devices 123 through one or more signal splitters 125. Unless otherwise indicated herein, any signal splitter may also be used as a signal combiner, depending upon the configuration of coupled devices. The data services signal can thereby be distributed throughout much or all of the property, both inside and outside of structures, without requiring, any additional wired or wireless connections between access points.

The CATV gateway device 113 is shown in FIG. 2A. The incoming CATV signal is passed into the CATV gateway device 113 from the gateway coaxial cable 111, and a gateway signal splitter 127 splits the incoming CATV signal into the broadcast audio and video services signal and the data services signal. The broadcast audio and video se ices signal is passed to a video and audio processor 129, which process the broadcast audio and video services signal for use on the property, and passes the processed broadcast audio and video services signal to a signal combiner 131. The signal combiner 131 is coupled to a distribution coaxial cable 133, which connects the output signal from the CATV gateway device 113 to the coaxial cable network for the property. The coaxial cable network may have a plurality of termination points, and these termination points may include set-top boxes, televisions, extension devices 123, or any other device used by the property occupant to receive and process the output signal from the CATV gateway device 113.

The data services signal passes from the gateway signal splitter 127 to a cable modem 139, which demodulates the data services, signal into a baseband data signal. In certain embodiments, the baseband data signal may be an Ethernet signal, a USB signal, and the like. In other embodiments, the baseband data signal may be any other signal type which suits the needs of a particular design implementation. The baseband data signal passes into a signal transceiver 143, which communicates the baseband data signal as the transceiver signal with other signal transceivers, one of which is incorporated into the CATV tap-off device 103, and others of which may be incorporated within the extension devices 123. The signal transceiver 143, which is configured to communicate the baseband data signal to other signal transceivers as a transceiver signal. Communicating the baseband data signal as a transceiver signal may be implemented in several different ways, with a couple different options for implementation discussed further below. In certain embodiments, a programmable processor may be coupled to the signal transceiver 143 in order to effectuate some of the functionality disclosed herein.

The signal transceiver 143 communicates the transceiver signal through a band pass filter 145 back to the gateway signal splitter 127, from which the transceiver signal passes onto the gateway coaxial cable 111 and back to the CATV tap-off device 103. The signal transceiver 143 may also communicate the transceiver signal with the signal combiner 131, from which the transceiver signal is directed toward one or more extension devices 123, as shown in FIG. 1. In certain embodiments, the signal transceiver 143 may also incorporate a gateway node so that the signal transceiver may also generate a wireless signal from the baseband data signal. The wireless signal may be wirelessly transmitted to one or more computing devices using, the gateway antenna 147. The wireless signal may be a WiFi signal, or any other type of signal appropriate for communicating wirelessly between computing devices. In other embodiments, the gateway node may be independent from the transceiver 141. By including, a gateway node as part of the CATV gateway device 113, the CATV gateway device 113 may serve as a wireless access point.

Depending upon the characteristics of the chosen baseband data signal and the physical medium over which it is being transmitted, the baseband data signal may need to be converted into a different signal type (which for many types of signals, may be nothing more than a frequency conversion, although other more complex signal conversions are contemplated) in order to be communicated as the transceiver signal. In addition, advantages may be gained by having the transceiver signal in a frequency spectrum that facilitates communication over coaxial cable without overlapping with the broadcast audio and video services signal that is also communicated over the coaxial cable, since both signals, the transceiver signal and the broadcast audio and video services signal are communicated over some of the same coaxial cable that serves as the backbone for data services.

Figure 2B:
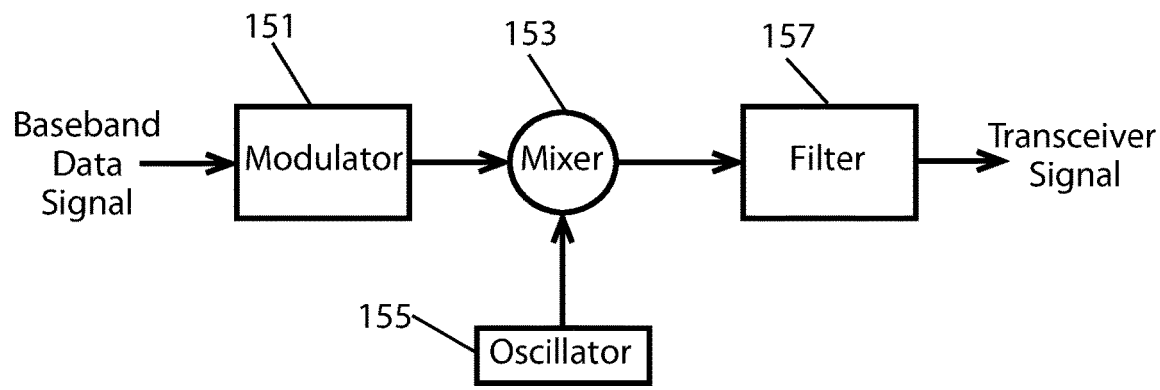
FIG. 2B is a schematic diagram showing the transmit side of a transceiver for the gateway device of FIG. 2A.

The transmit side of the signal transceiver 143 of FIG. 2A is shown in FIG. 2B. The baseband data signal received by the signal transceiver 143 passes into a modulator 151, which servers to convert the baseband data signal into the signal form chosen for the desired transceiver signal. A mixer 153 receives the output of the modulator 151, and the mixer 153 also receives an oscillator input from a local oscillator 155. As is well known in the art, the mixer 153 produces two signals as output, one at the sum of the input frequencies and one at the difference of the input frequencies. Output from the mixer 153 passes through a band pass filter 157, which is configured to pass only one of the two signals output from the mixer 153. The output of the band pass filter 157 is the transceiver signal.

Figure 2C:
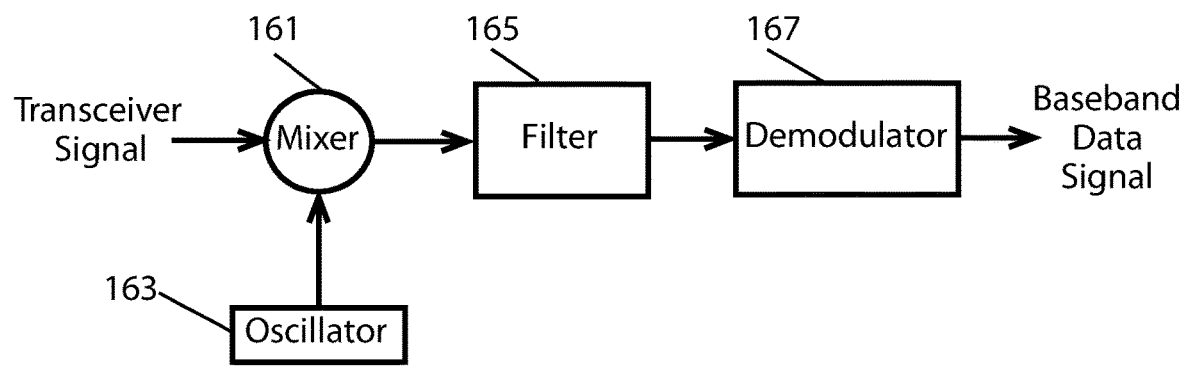
FIG. 2C is a schematic diagram showing the receive side of a transceiver for the gateway device of FIG. 2B.

The receive side of the signal transceiver 143 of FIG. 2A is shown in FIG. 2C. The transceiver signal received by the signal transceiver 143 passes into a mixer 161, and the mixer 161 also receives an oscillator input from a local oscillator 163. The mixer 161 produces two signals as, output, one at the sum of the input frequencies and one at the difference of the input frequencies. Output from the mixer 161 passes through a second band pass filter 165, which is configured to pass only one of the two signals output from the mixer 161. The output of the second band pass filter 165 then passes through a demodulator 167, which produces the baseband data signal as output.

In certain embodiments, where the baseband data signal is already in the signal form chosen for the desired transceiver signal (but not at the frequency desired for the transceiver signal), the demodulator 167 may be omitted.

As is known to those of skill in the art, typical broadcast audio and video services signals are communicated in a frequency spectrum of about 500 MHz to about 1.5 GHz. Therefore, the lower end of the frequency spectrum for the transceiver signal should be above 1.5 GHz, although to avoid overlap and allow for expansion of the broadcast audio and video services signals, the lower end of the frequency spectrum for the transceiver signal should be at least 1.8 GHz, or even above 2.0 GHz. Certain WiFi standards use frequencies in the range of one or both of 2.4 GHz-2.5 GHz and 5.0 GHz-5.24 GHz, so that WiFi signals may be communicated between the various signal transceivers, as transceiver signals, without the need for conversion at any stage other than at the signal transceiver 143 of the CATV gateway device 113. To simplify the use of WiFi frequencies further, the cable modem 139 may be configured to demodulate the data services signal directly into a WiFi signal. In other embodiments, the cable modem may demodulate the data services signal to a baseband data signal, such as an Ethernet signal, and that Ethernet signal may then be modulated to generate a WiFi signal.

In certain embodiments, the gateway access point may operate at the WiFi standard frequency range of 5.0 GHz-5.24 GHz, and some or all of the access points included in the extension devices 123 (see below) may operate at the WiFi standard frequency range of 2.4 GHz-2.5 GHz.

In other embodiments, the cable modem 139 may be configured to demodulate the data services signal into an Ethernet signal, and the signal transceiver 143 of the CATV gateway device 113 may convert the Ethernet signal into a transceiver signal having a frequency spectrum in the 3 GHz-6 GHz range. One frequency spectrum that has been found to work particularly well is the 3.3 GHz-4.7 GHz range, which may be implemented using an Ethernet-overcoax bridge, such as one available from Pulse-Link of Carlsbad, Calif. Various implementations of Ethernet-over-coax are disclosed in U.S. Pat. Nos. 6,781,530; 6,782,048; 6,836,223; 6,937,674; 7,046,618; 7,099.368; 7,190,722; and 7,299,042, the disclosures of which are incorporated herein by reference in their entirety.

Certain benefits may be realized by implementing the above system for distributing a transceiver signal over coaxial cable to create a network around a property and within structures on the property. For one, the higher frequency spectrums were previously unusable, as coaxial cable was not designed for use with such higher frequencies. Likewise, existing systems in homes and businesses that are used to connect to the coaxial cables were not designed to operate at the higher frequencies. The use of the higher frequencies, on the backbone that was not designed for those frequencies, separates the frequency bands of the transceiver signals from the broadcast audio and video signals, thereby enabling a broader distribution of the data signal around a property and within structures on the property. With more wireless access points on a property, each wireless access point may be operated at a lower power. In turn, this enables wireless devices accessing the wireless access points to operate at a lower power, thereby enabling the battery life of some mobile devices to be extended and enabling communication between mobile devices and the wireless access point to occur more frequently at higher, more optimum, data rates, through frequency reuse.

The CATV gateway device 113 may be configured to provide other functionality, video transcoding, video storage, maintaining and enforcing conditional network access privileges, IP routing, and IP video.

Figure 3:
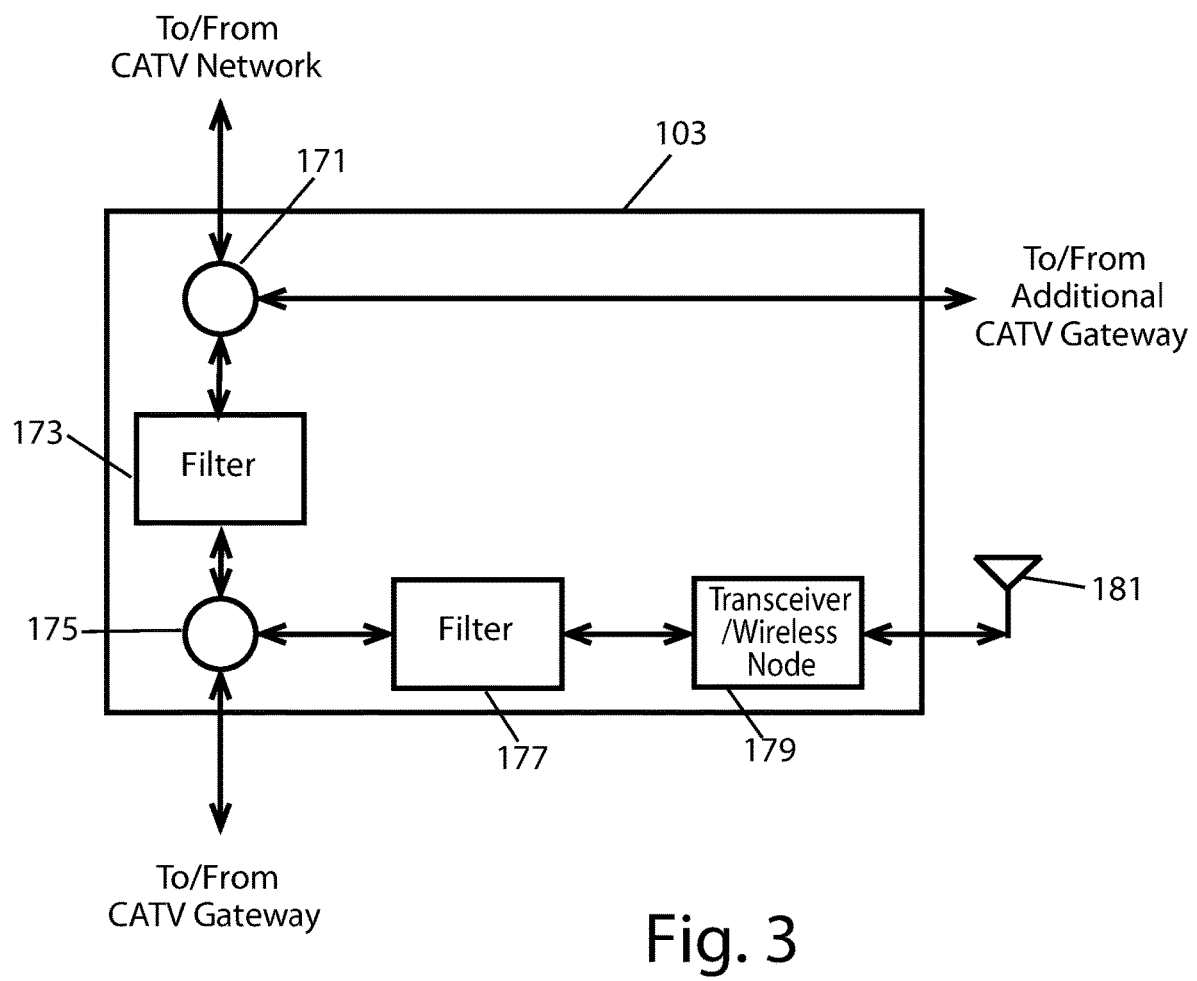
FIG. 3 is a schematic diagram showing a tap-off device for the system of FIG. 1.

A detailed view of an embodiment of the CATV tap-off device 103 is shown in FIG. 3. This CATV tap-off device 103 includes the CATV signal splitter 171 which splits the incoming CATV signal off from the main CATV signal and passes the incoming CATV signal through a band reject filter 173 to a tap-off signal splitter 175. As indicated above, the CATV tap-off device 103 may pass the CATV signal through to additional CATV tap-off devices. The band reject filter 173 rejects the frequencies at which the transceiver signal operates so that the transceiver signal is isolated from and kept off the CATV network. The tap-off signal splitter 175 couples the incoming CATV signal to and from the gateway coaxial cable 111, and the tap-off signal splitter 175 also couples the transceiver signal received over the gateway coaxial cable 111 through a band pass filter 177 and to a signal transceiver 179. The band pass filter 177 passes frequencies at which the transceiver signal operates. The signal transceiver 179 is coupled to an antenna 181 so that the CATV tap-off device 103 can serve as a wireless access point, such as a WiFi access point. Depending upon the type of signal used as a basis for the transceiver signal, the signal transceiver 179 may be coupled to the antenna 181 through a wireless node, as shown, so that the output of the signal transceiver 179 may be converted into a wireless signal. Alternatively, the functionality of a wireless node may be incorporated into the signal transceiver 179.

The signal transceiver 179 of the CATV tap-off device 103 operates with the same functionality as described above for the signal transceiver of the CATV gateway device. The signal transceiver 179 is configured to be complementary to the way in which the signal transceiver of the CATV gateway device operates. Therefore, in certain embodiments, the signal transceiver 179 may be configured to convert the transceiver signal to and from the baseband data signal (i.e., the baseband data signal type generated by the cable modem of the CATV gateway device), which may be an Ethernet signal or any other type of signal.

One advantage of the CATV tap-off device 103, as compared to those of the prior art, is that it does, not include a cable modem. Instead, the cable modern of the CATV gateway device, which is placed on a property, is leveraged to enable providing wireless network service from the CATV tap-off device 103.

Figure 4:
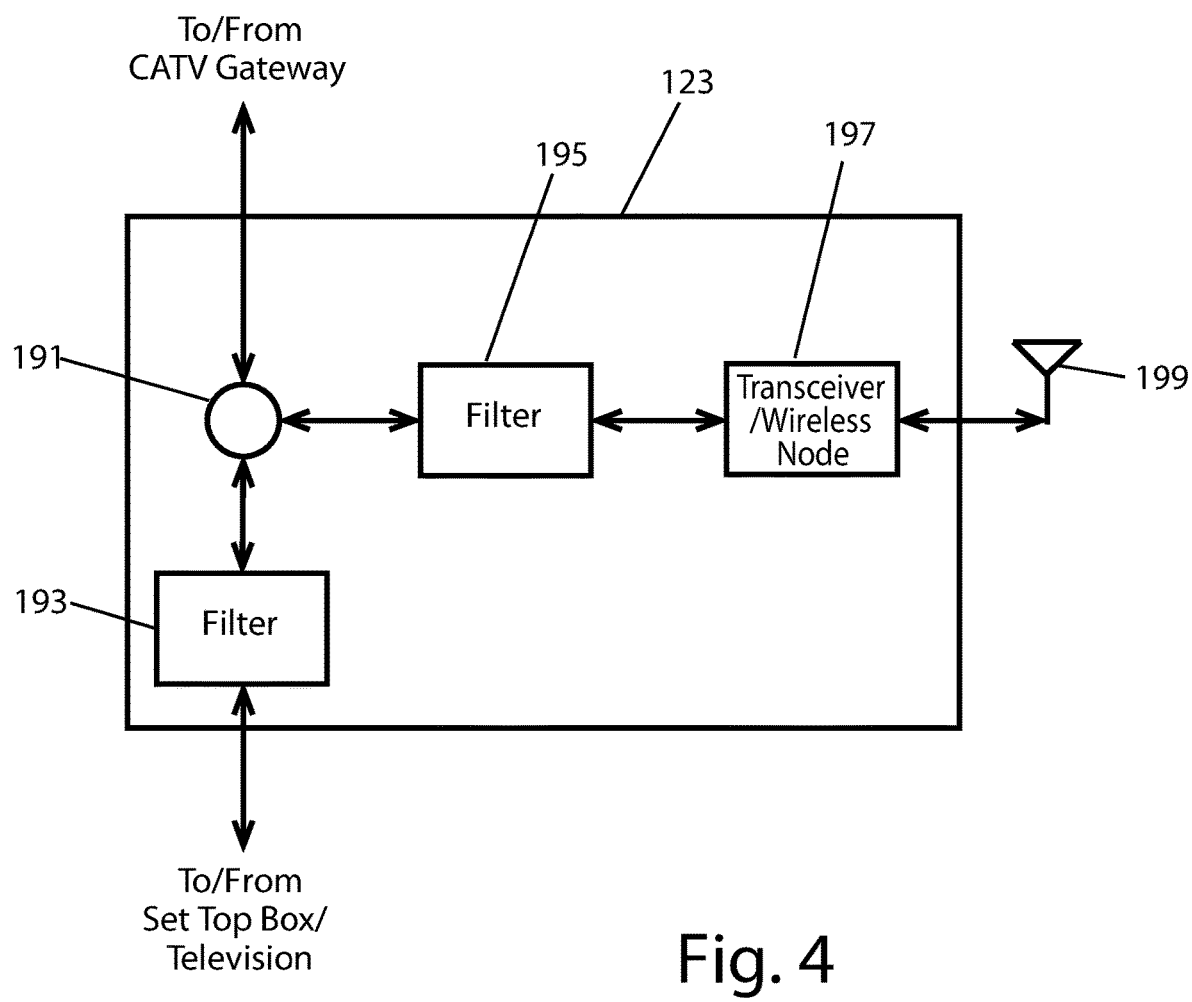
FIG. 4 is a schematic diagram showing an extension device for the system of FIG. 1.

A detailed view of an embodiment of an extension device 123 is shown in FIG. 4. This extension device 123 includes a signal splitter 191 to split the incoming signal, which includes both the broadcast audio and video services signal and the transceiver signal, from the CATV gateway device. The signal splitter 191 couples the incoming signal to a band reject filter 193 and to a band pass filter 195. The band reject filter 193 rejects the frequencies at which the transceiver signal operates so that the broadcast audio and video services signal may be passed to a set-top box or a television without interference from the transceiver signal. The band pass filter 195 passes frequencies at which the transceiver signal operates through to a signal transceiver 197.

The signal transceiver 197 is coupled to an antenna 199 so that the extension device 123 can serve as a wireless access point, such as a WiFi access point Depending upon the type of signal used as a basis for the transceiver signal, the signal transceiver 197 may be coupled to the antenna 199 through a wireless node so that the output of the signal transceiver 197 may be converted into a wireless signal. Alternatively, the functionality of a wireless node may be incorporated into the signal transceiver 197.

In certain embodiments, the plurality of wireless access points may operate independently of one another, with the power output and wireless channel of each access point being passively set or actively controlled to by the programmable processor of the CATV gateway device, the latter by incorporation of a control channel within the transceiver signal, to reduce and/or prevent interference between different wireless access points. The programmable processor of the CATV gateway device may also control hand-offs between different wireless access points when a computing device moves m relation to the different wireless access points.

The signal transceiver 197 of the extension device 123 operates with the same functionality as described above for the signal transceiver of the CATV gateway device. The signal transceiver 197 is configured to be complementary to the way in which the signal transceiver of the CATV gateway device operates. Therefore, as appropriate, the signal transceiver 197 may be configured to act solely as a signal amplifier, so that the transceiver signal is amplified when being sent to the signal transceiver of the CATV gateway device. In other embodiments, the signal transceiver 197 may be configured to convert the transceiver signal to and from the baseband data signal (i.e., the baseband data signal type generated by the cable modern of the CATV gateway device), which may be an Ethernet signal or any other type of signal.

In certain embodiments, the extension device 123 may also include a wired network connection, such as an Ethernet connection, so that computing devices may connect to the network and utilize the data services through a wired connection.

The system of FIGS. 1-4 utilizes the modem included at the CATV gateway device to generate a more ubiquitous wireless network on a property, in a building situated on a property, or both, and that wireless network can extend seamlessly both inside and outside of structures on the property. For embodiments in which the transceiver signal is based upon a wireless signal, such as a WiFi signal, then the transceiver at the CATV gateway may be configured to utilize the multiple antennas, which may be included in the CATV gateway devices, the CATV tap-off devices, and the extension devices, to provide improved RF communications, in terms of throughput, range, delay, and accuracy, of both the transmitted and received transceiver signals, in addition, the system can be adapted to take advantage of known Multiple Input/Multiple Output (MIMO), advanced beam forming, adaptive array, and other "smart antenna" technologies.

Figure 5:
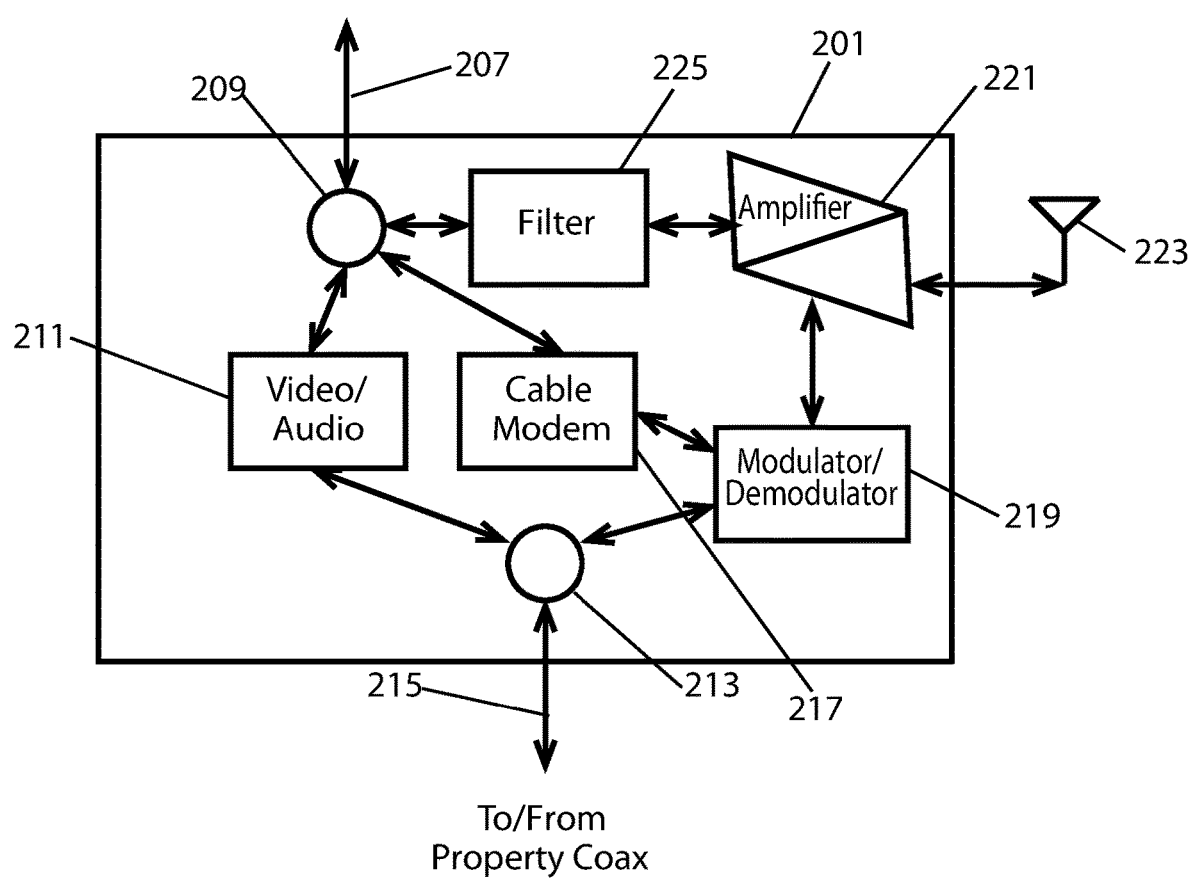
FIG. 5 is a schematic diagram showing a first alternative gateway device for the system of FIG. 1.
Figure 6:
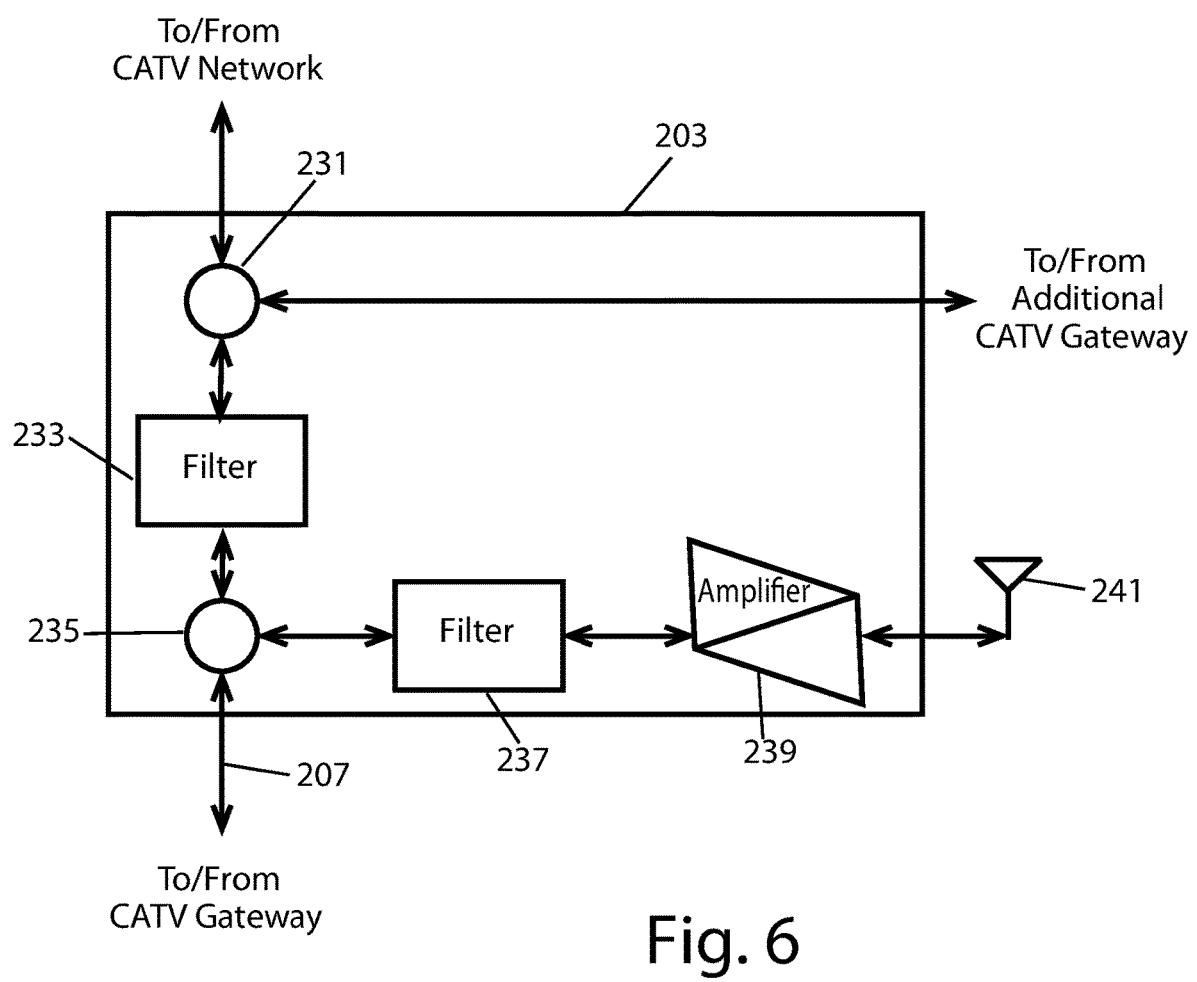
FIG. 6 is a schematic diagram showing a first alternative tap-off device for the system of FIG. 1
Figure 7:
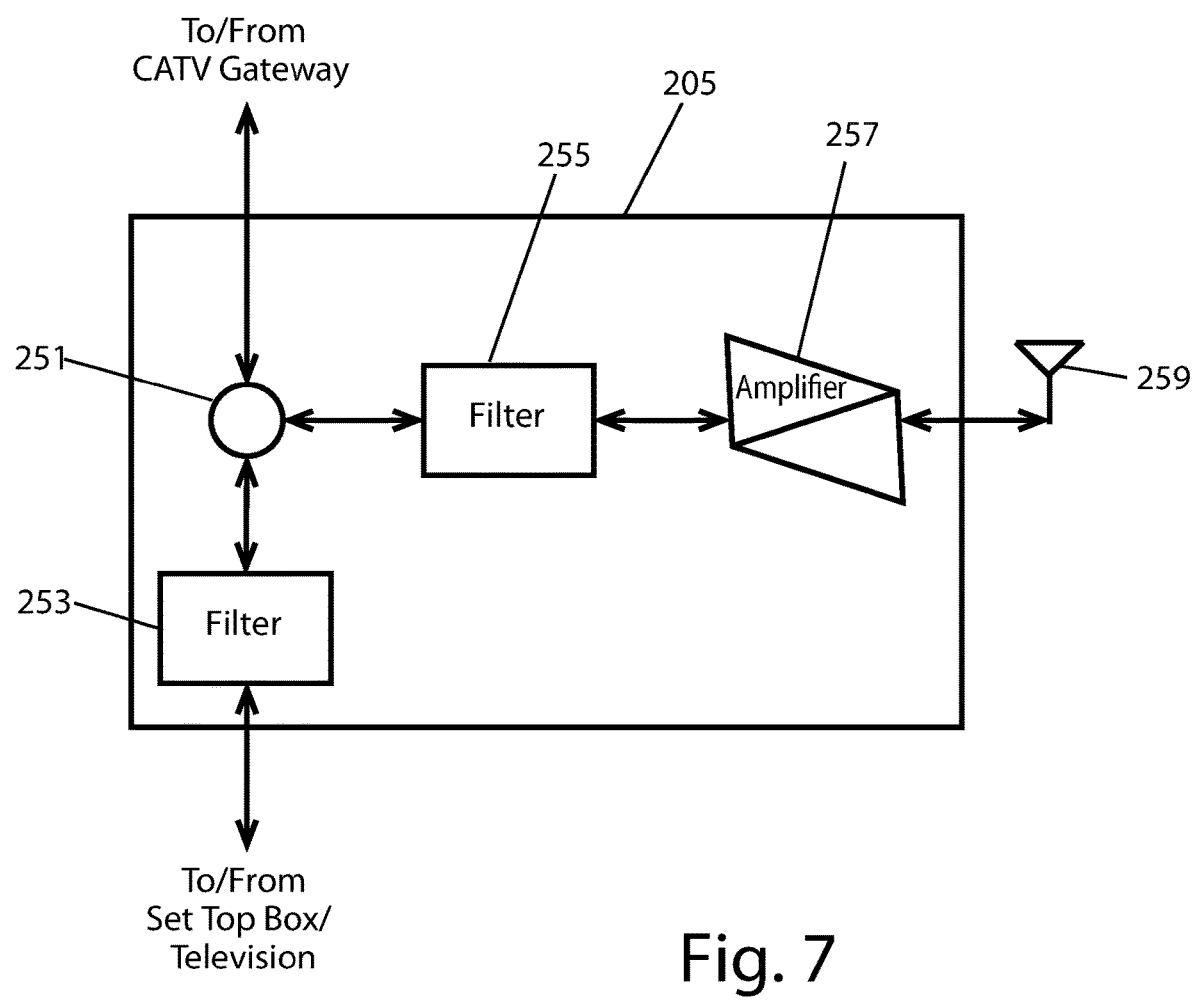
FIG. 7 is a schematic diagram showing a first alternative extension device for the system of FIG. 1.

Alternative embodiments for each of the CATV gateway device 201, the CATV tap-off device 203, and the extension device 205 are shown in FIGS. 5-7, respectively. The incoming CATV signal passes into the CATV gateway device 201 from the gateway coaxial cable 207, and a gateway signal splitter 209 splits the incoming CATV signal into the broadcast audio and video services signal and the data services signal. The broadcast audio and video services signal passes into a video and audio processor 211, which processes the broadcast audio and video services signal for use on the property and then passes the processed broadcast audio and video services signal to a signal combiner 213. The signal combiner 213 is coupled to a distribution coaxial cable. 215, which connects the output signal from the CATV gateway device 201 to the coaxial cable network for the property. The coaxial cable network may have a plurality of termination points, and these termination points may include set-top boxes, televisions, extension devices 205, or any other device used by the property occupant to receive and process the output signal from the CATV gateway device 201.

The data services signal passes from the gateway signal splitter 209 to a cable modem 217, which demodulates the data services signal into a baseband data signal. In certain embodiments, the baseband data signal may be an Ethernet signal. In other embodiments, the baseband data signal may be any other signal type which suits the needs of a particular design implementation. The baseband data signal passes into a modulator/demodulator 219, which modulates the baseband signal to generate a wireless signal. The wireless signal may be a WiFi signal, or any other type of signal appropriate for communicating wirelessly between computing devices. The wireless signal passes into an amplifier 221, from which it may be wirelessly transmitted over the antenna 221, so that the CATV gateway device may serve as a gateway access point. In certain embodiments, the antenna 223 may be omitted. The amplified wireless signal may also pass onto the gateway coaxial cable 207, through a band pass filter 225, and back to the CATV tap-off device 203. The modulator/demodulator 219 may also communicate the wireless signal with the signal combiner 213, from which the wireless signal passes toward one or more extension devices 205, as shown in FIG. 1.

The alternative embodiment of the CATV tap-off device 203 is shown in FIG. 6. This CATV tap-off device 203 includes the CATV signal splitter 231 which splits the incoming CATV signal off from the main CATV signal and passes the incoming CATV signal through a band reject filter 233 to a tap-off signal splitter 235. As indicated above, the CATV tap-off device 203 may pass the CATV signal through to additional CATV tap-off devices. The band reject filter 233 rejects the frequencies at which the wireless signal from the CATV gateway device 201 signal operates so that the wireless signal is isolated from and kept off the CATV network. The tap-off signal splitter 235 couples the incoming CATV signal to the gateway coaxial cable 207, and the tap-off signal splitter 235 also couples the wireless signal received over the gateway coaxial cable 207 through a band pass filter 237 and to an amplifier 239. The band pass filter 237 passes frequencies at which the wireless signal operates. The amplifier 239 is coupled to an antenna 241 so that the CATV tap-off device 203 can serve as a wireless access point, such as a WiFi access point.

The alternative embodiment of the extension device 205 is shown in FIG. 7. This extension device 205 includes a signal splitter 251 to split the incoming signal, which includes both the broadcast audio and video services signal and the wireless signal, from the CATV gateway device. The signal splitter 251 couples the incoming signal to a band reject filter 253 and to a band pass filter 255. The band reject filter 253 rejects the frequencies at which the wireless signal operates so that the broadcast audio and video services signal may be passed to a set-top box or a television without interference from the wireless signal. The band pass filter 255 passes frequencies at which the wireless signal operates through to an amplifier 257, which is coupled to an antenna 259 so that the extension device 205 can serve as a wireless access point, such as a WiFi access point.

In this alternative embodiment, a wireless signal that has a frequency spectrum outside of the frequency spectrum in which typical broadcast audio and video services signals are communicated may be used as a basis for creating a wireless network on a property and/or in and around a structure on the property. Using such a system, some of the advantages discussed above may be realized.

Figure 8:
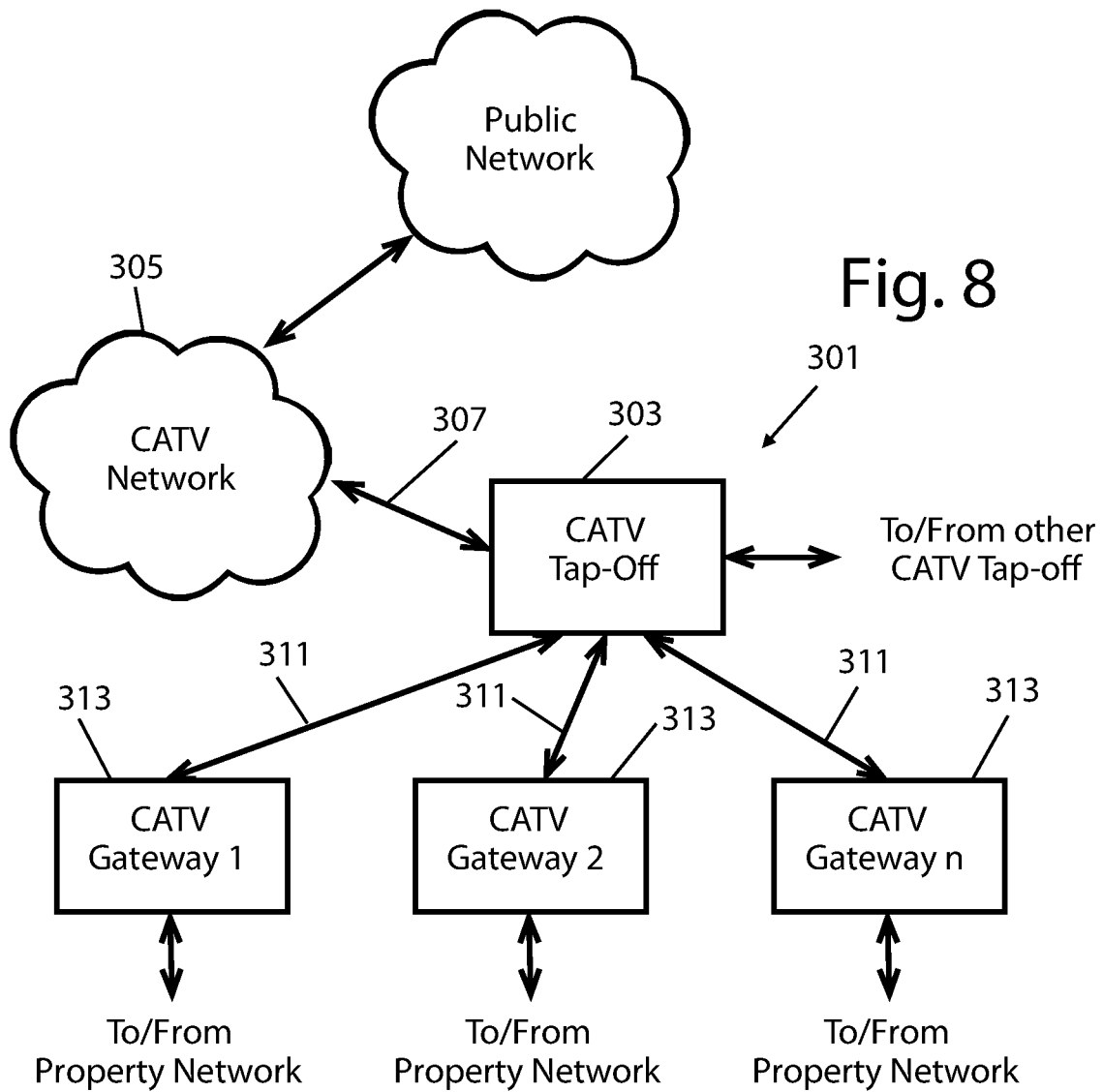
FIG. 8 is a schematic diagram showing a second system for providing data services through a CATV tap-off device.
Figure 9:
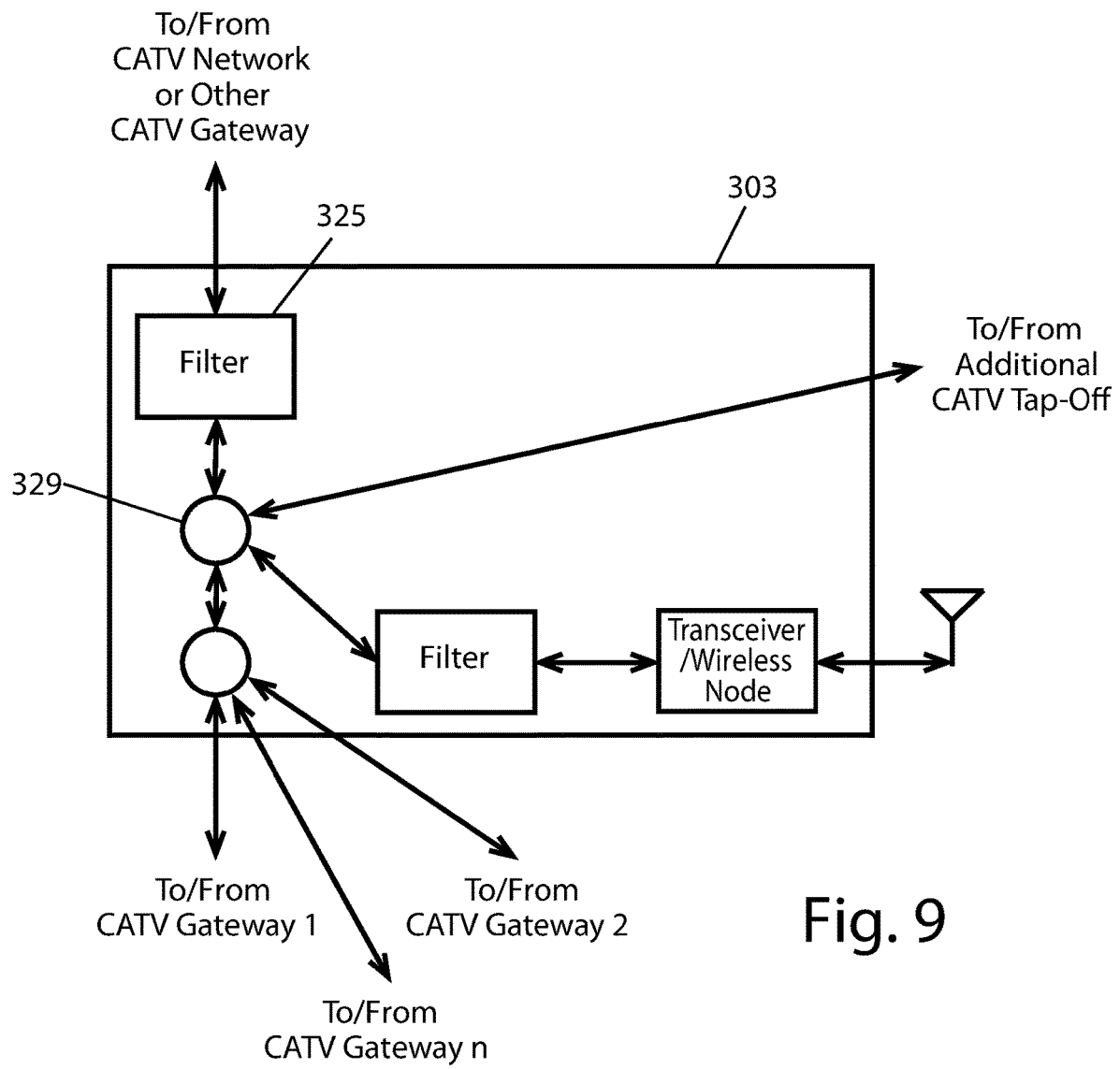
FIG. 9 is a schematic diagram showing a tap-off device for the system of FIG. 8.

FIG. 8 shows a second system 301 for providing data services through a CATV tap-off device 303. Like the system of FIG. 1, the CATV tap-off device 303 is connected to the CATV network 305 through a network coaxial cable 307 for receiving a CATV signal. The network coaxial cable 307 communicates with the CATV tap-off device 303 to provide the CATV signal to the CATV tap-off device 301. The CATV tap-off device 303 is connected through gateway coaxial cables 311 to several CATV gateway devices 313, each of which are placed on a property or on several properties, generally on or around the exterior of a building or structure, or within the building or structure, to provide easier access for service calls, or within a building or structure. The CATV tap-off device 303 may be connected to a of additional CATV gateway devices by passing through the CATV As is shown in FIG. 9, a band reject filter 325 is included in the CATV tap-off device 303 to reject the frequencies at which the transceiver signal operates so that the transceiver signals are isolated from and kept off the CATV network 303. Additional band reject filters may also be included between CATV gateway devices. Any such additional band reject filters would similarly reject the frequencies at which the transceiver signals operate for each respective CATV tap-off device so that the transceiver signal for each CATV tap-off device is isolated from other CATV tap-off devices.

Each of the CATV gateway devices 313 may be coupled to one or more extension devices. Each of the CATV gateway devices 313 are as described above in FIG. 2A, and each of the extension devices are as described above in FIG. 4. Again, the CATV tap-off device 303 is similar to the CATV tap-off device described above and shown in FIG. 3, with the position of the band reject filter 325 in the CATV tap-off device 303 shown in FIG. 9 being, different relative to the CATV signal splitter 329. As indicated above, the band reject filter 325 is positioned to isolate the transceiver signal from the CATV network or from upstream CATV tap-off devices.

With this system 301, a more ubiquitous wireless network may be established throughout a property and/or structure, or throughout several properties and/or structures. This more ubiquitous wireless network may take advantage of combining bandwidths available from multiple CATV gateway devices to provide additional bandwidth to the wireless node at the CATV tap-off device. The increased bandwidth may also be used to direct additional bandwidth from one or more CATV gateway devices to another one of the CATV gateway devices when additional bandwidth is needed at the latter. This bandwidth sharing may be accomplished by communications between the programmable processors included with the signal transceivers of each of the CATV gateway devices. As an example, the programmable processor of a first of the signal transceivers may request additional bandwidth from the programmable processors of other, less loaded, signal transceivers, with the additional bandwidth then being provided by routing at least a portion data service signals through the less loaded signal transceivers to the first signal transceiver. As indicated above, communications between the various programmable processors may be accomplished by establishing a control channel within the transceiver signal that is reserved for this and other command and control communications. In certain embodiments, the signal transceiver of the CATV tap-off device may also include a programmable processor which communicates with the programmable processors of the signal transceivers within each CATV gateway device to effectuate bandwidth redistribution on an as-needed basis. The programmable processor may be programmed to redistribute bandwidth on an on-demand basis by determining in real-time which other CATV gateways have bandwidth that may be allocated to another of the CATV devices, or it may be programmed to redistribute bandwidth based on demand and statistical analysis of past usage. A combination of both redistribution techniques may also be implemented.

Controlling a Camera or Tap Controller

As discussed above, it can be advantageous to control a wide variety of functionality and information flow at a CATV tap. One approach would require that a communications transceiver (or at a minimum, a receiver or transmitter) be included within the CATV tap, for communicating such control and information to and/or from the tap to the central CATV office (CATV headend). At the CATV headend, a companion transceiver (or at a minimum, transmitter or receiver) would be required to communicate that information to and/or from the tap. The transceiver at the CATV headend would likely be a custom device, in order to support any unique communications protocols and/or frequencies of a specific vendor's tap(s), and would also need to be integrated into any of the existing CATV headend hardware and software. Adding custom hardware and/or software into a CATV headend, however, is difficult, expensive, and problematic for a CATV operator.

These problems can be avoided or minimized by using existing hardware, standards, and protocols already present within a CATV network. One such existing standard is DOCSIS (Data Over Cable Service Interface Specification), which is widely deployed within. CATV systems worldwide. It provides for high-speed data communications between the CATV headend and a CATV subscriber's home or business. At the CATV headend, the CMTS (Cable Modem Termination System) connects to the internet and also communicates with each of the CATV subscriber's DOCSIS modems, located within their home or business. While this approach leverages existing industry standards and hardware, it does not provide a communication's path to and/or from the CATV tap, but rather just to and/or from a CATV subscriber's home or business and the CATV headend.

One embodiment of the invention leverages the DOCSIS communication infrastructure to support communications to and/or from the CATV tap. It does this by providing a supplemental communications link to and/or from the CATV's subscriber's home or business and its associated tap. Note that the invention is not limited to the use of DOCSIS, however, as other standards can be used.

Figure 10:
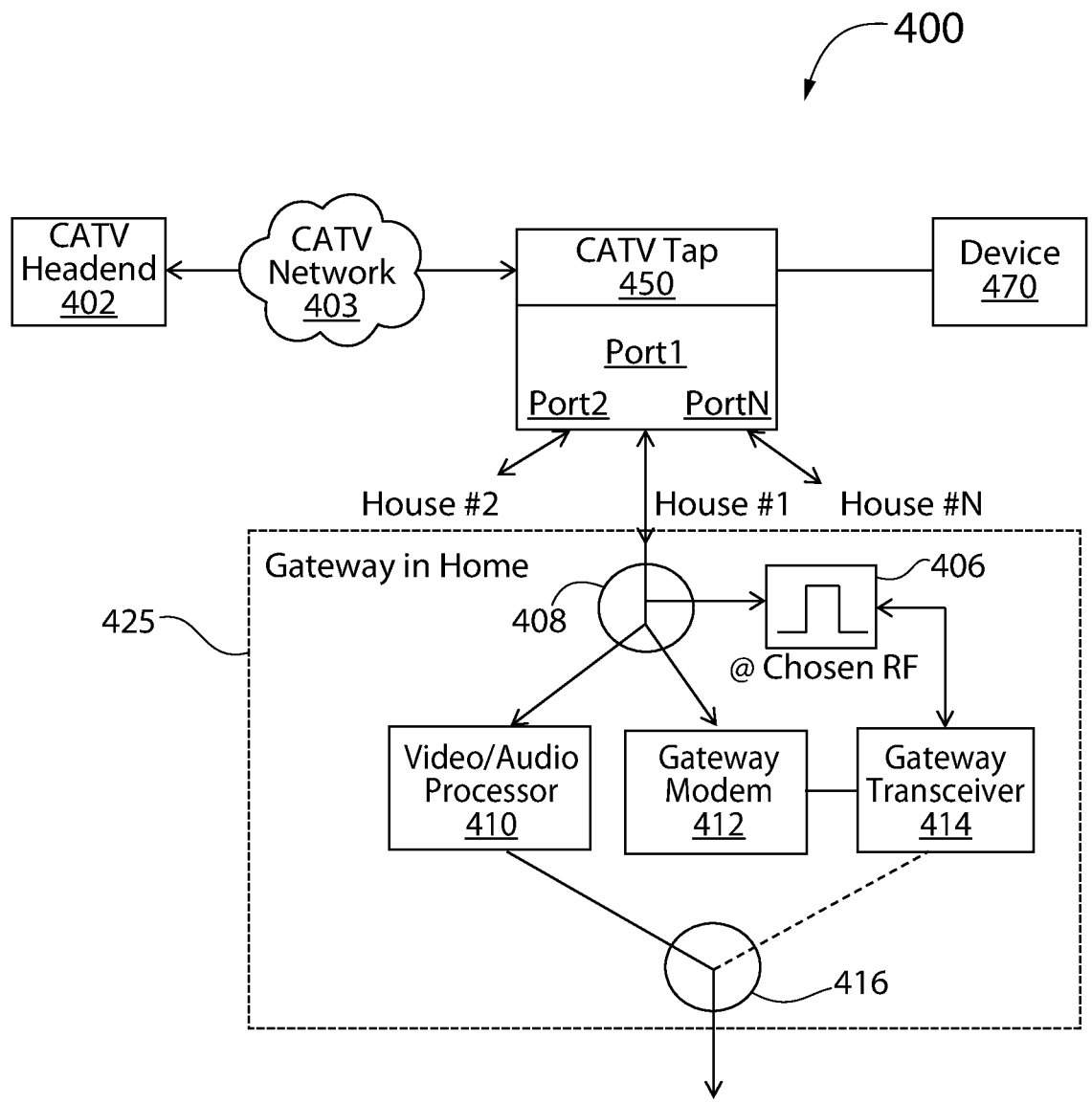
FIG. 10 is a schematic diagram of another system for communicating data through a CATV tap.

FIG. 10 is a schematic diagram of a system 400 for carrying out such an implementation for communicating data through a CATV tap, where a supplemental communications link is made between a CATV tap 450 and a subscriber's existing modem 412. In FIG. 10, the CATV headend 402 is connected to a CATV tap 450 via a CATV distribution network 403. Although not shown, there could be other components between the CATV headend 402 and the CATV tap 450, such as CATV node(s), amplifier(s), and even one or more additional taps. The CATV tap 450 can "split off" a portion of a CATV signals from the CATV network 403, and send those signals to and/or from a CATV gateway 425.

In the exemplified embodiment, the CATV gateway device is located in a subscriber building (such as a home or business) receiving data communication services, and the CATV tap is be located outside the subscriber building, though the invention is not so limited. The CATV tap 450 can service a number of homes and businesses, typically from 2 to 8. As such, the CATV tap 450 is typically (although not exclusively) located externally from the subscriber's home or business, such as on or near the top of the closest utility pole, on the ground surface in a vault or pedestal, or within the basement of an MDU (Multi Dwelling Unit) or business. In the exemplified embodiment, the CATV tap 450 comprises CATV ports, and the CATV gateway device 425 is operably coupled to the CATV tap 450 through one of the CATV ports. In other embodiments, other means of communication can be used, such as wireless communications.

Also shown in FIG. 10 are the components located at the gateway 425, which in this embodiment is located within the subscriber's home or business. As the signal from the CATV tap 450 enters House 1 (or Houses 2-N), it is split into several paths, via the signal splitter 408. One of these outputs is connected to a video/audio processor 410, such as a "CATV Set-Top." Another of the outputs is connected to the gateway modem 412. In this embodiment, the gateway modem 412 is a DOCSIS cable modem, though the invention is not so limited. The gateway modem 412 can be connected to a router, possibly also including or connected to a Wi-Fi node (not shown). Further, the video/audio processor 410 and gateway transceiver 414 can be connected to a signal combiner 416.

In the proposed invention, the output of the gateway modem 412 is also connected to a gateway transceiver 414. This gateway transceiver 414 communicates via a band pass filter 406 and signal splitter 408 with the CATV tap 450, which in turn has another transceiver (see FIGS. 11 and 12). This communication, which enables communication between the tap 450 and the gateway modem 412, can be facilitated on a wide variety of frequency bands (generally below 50 MHz or above 2.0 GHz), and preferably operate above or below the frequency range typically used by the CATV operator to send and receive their CATV signals over their CATV network 403. Some (although not all) such examples of these useable frequency bands can include 2.4-2.5 GHz, 3.3-4.7 GHz, 5.0-5.24 GHz, and 1.125-1.675 GHz. This frequency band is referred to as the "Chosen RF" in FIGS. 10-12.

FIG. 10 anther shows a device 470 operably coupled to the CATV tap 450 and configured to send or receive device data. The foregoing communications link can allow communication between the device 470 and the gateway modem 412 via the tap 450. The device 470 can be any device (separate from or part of the tap) for transmitting and/or receiving data. For purposes of the present disclosure, the term "device data" refers to any type of information related to the device that this sent to or received from the device, and any derivates thereof, regardless of the form of the extracted information, and combinations thereof. By way of example, device data may be in the form of mathematical data (such as a formula which mathematically represents at least part of an image or a sensor signal), analog data (such as the waveform of a signal), and/or digital data (such as a representation of at least part of the sensor signal in a digital format). For example, the device data can comprise control data for controlling the device or monitoring data generated by the first device. As will be discussed below, the device 470 can be, for example, a security camera or a tap controller. The tap transceiver of the CATV tap can be configured to communicate the device data between the first device 470 and the gateway transceiver 414 and modem 412.

Figure 11:
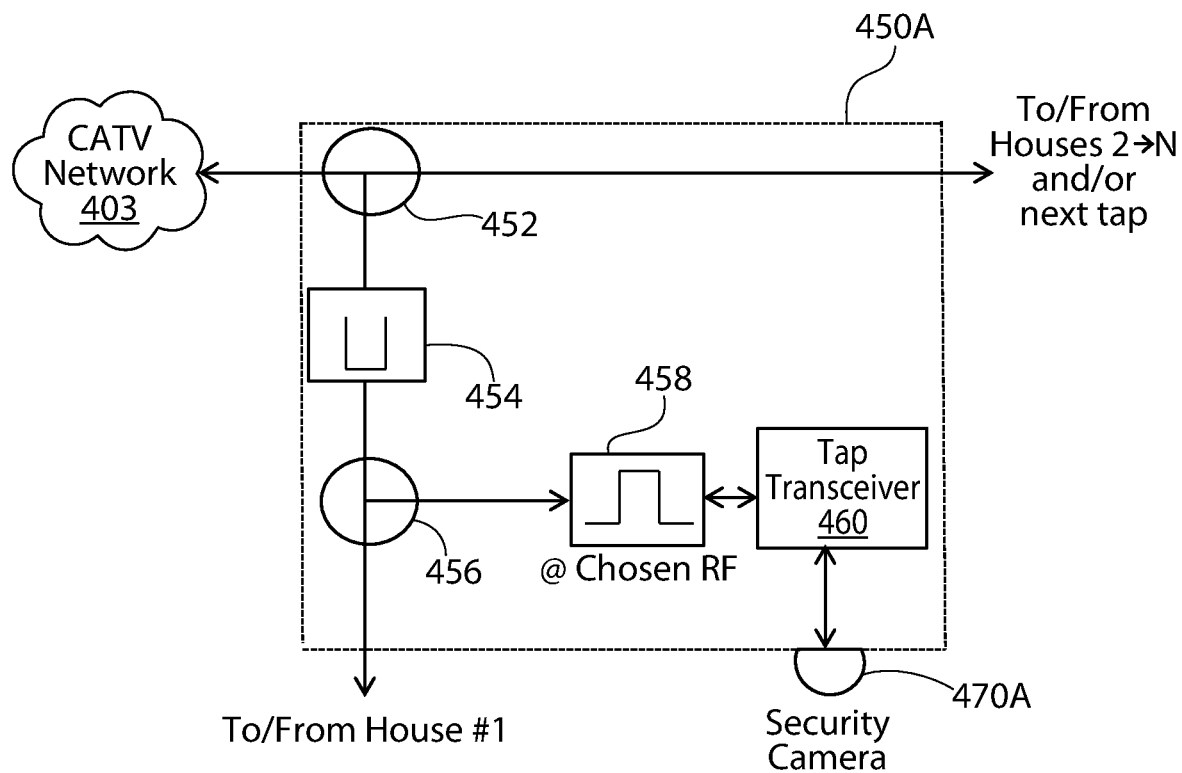
FIG. 11 is a schematic diagram of CATV tap communicating with a camera.
Figure 12:
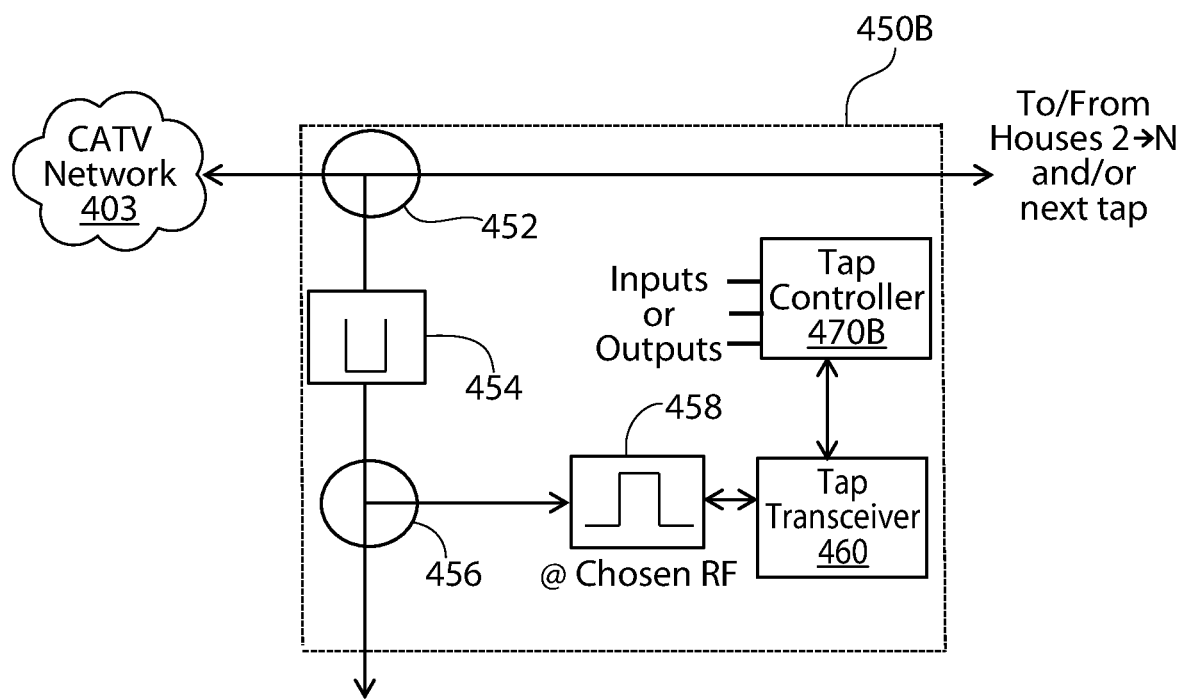
FIG. 12 is a schematic diagram of CATV tap communicating with a controller.

FIG. 11 is a schematic diagram of CATV tap 450A communicating with a camera 470A, while FIG. 12 is a schematic diagram of CATV tap 450B communicating with a controller 470B. Most components of these taps 450A, 450B are identical, having the same capabilities, and therefore descriptions of their functionality are not repeated. In these embodiments, the tap is outside the house with which it is communicating. The tap 450A, 450B can be connected to additional taps, as indicated. A signal splitter 452 can send and receive signals front the CATV network 403 and any of Houses 1-N. As discussed, the taps 450A, 450B can each include a tap transceiver 460, which is used to communicate with House 1 (or Houses 2-N) via a band pass filter 458 and a signal splitter 456 within the tap 450A. Additionally, a band reject filter 454 may be included to prevent the signals used to communicate between the tap 450 and gateway 425 of House 1 (or gateways of or Houses 2-N) from "leaking" onto the CATV distribution network 403.

The tap transceiver 460 communicates on the same frequencies as the gateway transceiver 414 in FIG. 10, that is, the "Chosen RF" discussed above. As discussed, the communications can be facilitated on a wide variety of frequency bands, but preferably operate above or below (not overlapping with) the frequency range typically used by the CATV operator to send and receive their CATV signals over their CATV distribution network, such as below 50 MHz or above 2.0 GHz. If other House(s) served by the same tap (e.g., Houses 2-N) also have a gateway modem using the same standard (e.g., DOCSIS) and a transceiver, then these additional gateway modem(s) and transceiver(s) can also communicate with the tap transceiver 460 in FIGS. 11 and 12.

There are several novel uses for the above-described communications path between the gateway 425 and the tap 450, including interfacing the tap transceiver 460 to a camera 470A (such as a security camera), as illustrated in FIG. 11, or interfacing the tap transceiver 460 to a controller 470B, as illustrated FIG. 12. Each of these embodiments is discussed below.

For the security camera 470A at the tap 450A in FIG. 11, the image data (a form of monitoring data) from the camera 470A can be transmitted to tap transceiver 460, which can communicate the image data to the gateway(s) 425, which can then be made available within the House(s) 1-N (on a subscriber's display) and/or retransmitted back to the cable headend 402 via the gateway modem(s) 412 within the House(s). Having a security camera 470A at the tap 450A can also provide for an elevated vantage point from which to easily gather, transmit, view, and/or record such security video information. In other embodiments, monitoring data can be other types of data, such as photographic or sound data, or any other type of data related to monitoring.

As for FIG. 12, the tap controller 470B at the tap 450B can include several inputs author outputs, which can be used to control a wide variety of functions at the tap 450B, such as reducing, amplifying or conditioning the CATV signal level from the tap 450B or from the gateway(s) or disconnecting one or more of the gateway's signal(s) from the tap altogether. The data comprising the instructions for controlling the tap can be referred to as control data. In the exemplified embodiment, the tap controller 470B forms part of the tap 450B, but in other embodiments, the tap controller 470B or other device 470 can be separate from the tap.

If a building served by a tap 450B is disconnected, a means cat also be provided to reconnect the tap 450B when appropriate. For example, the tap 450B can, periodically, automatically, and momentarily reconnect to a gateway to determine if the tap should reconnect with the gateway until further notice, by command from the CATV headend or gateway. Alternatively, if more than one of the gateways served by the tap 450B have a similar modem and transceiver (as described above), then one of the other gateways can instruct the tap 450B to reconnect to the gateway originally disconnected.

Additionally, signal levels and quality and/or any impairment present at the tap 450B can be monitored and corresponding monitoring data can be transmitted to the gateway, which could also then be retransmitted back to the CATV headend 402 via the gateway modem for further processing, control and/or storage. The foregoing two tap controller functions can be combined to include both monitoring and co functionality.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system comprising:
  a cable television (CATV) tap operably coupled to a CATV network, the CATV tap comprising a tap transceiver located within the CATV tap;
  a CATV gateway device outside the CATV tap and operably coupled to the CATV tap, the CATV gateway device comprising:
    a gateway modem using a first communications standard to communicate with the CATV network; and
    a gateway transceiver operably coupled to the gateway modem and configured to be in direct and active communication with the tap transceiver over a coaxial cable; and a first device operably coupled to the CATV tap and configured to send or receive device data, the device data comprising:
control data for controlling the first device; or
monitoring data generated by the first device;
wherein the tap transceiver of the CATV tap is configured to communicate the device data between the first device and the gateway transceiver.

2. The system of claim 1 wherein the CATV gateway device is located in a subscriber building receiving data communication services, and the CATV tap is located outside the subscriber building.

3. The system of claim 1 wherein the first communications standard is a Data Over Cable Interface Specification (DOCSIS) standard.

4. The system of claim 1 wherein the tap transceiver and the gateway transceiver communicate using a transceiver frequency band that is non-overlapping with a frequency band used to send CATV signals over the CATV network.

5. The system of claim 1 wherein,
a second CATV gateway device is operably coupled to the CATV tap through a second one of the CATV ports; and
the second CATV gateway device comprises a second gateway modem configured to use the first communications standard of the CATV network, and a second gateway transceiver operably coupled to the gateway modem and configured to communicate with the tap transceiver.

6. The system of claim 1 wherein the first device is a camera, and the device data includes image data from images taken by the camera.

7. The system of claim 6 wherein the camera is a security camera mounted to a utility pole.

8. The system of 6 wherein the image data is transmitted from the tap transceiver to the gateway transceiver, and then to either a subscriber's display or to a CATV headend of the CATV network.

9. The system of claim 1 wherein the first device is a tap controller configured to control one or more functions at the CATV tap, and the device data is control data for controlling the CATV tap.

10. The system of claim 9 wherein the one or more functions controlled by the tap controller comprise reducing, amplifying, or conditioning a CATV signal level from the CATV tap or the CATV gateway device.

11. The system of claim 1 wherein the first device is a tap controller configured to disconnect one or more signals to or from the CATV tap.

12. The system of claim 11 wherein a second gateway modem of a second CATV gateway device is configured to reconnect the one or more signals to or from the CATV tap.

13. The system of claim 11 wherein, after disconnection, the CATV tap is configured to periodically reconnect the one or more signals to or from the CATV gateway device to receive a reconnection signal.

14. The system of claim 1 wherein the first device is a tap monitor configured to:
generate monitoring data regarding CATV signal levels and quality, or impairments present at the tap; and
transmit the monitoring data to a CATV headend of the CATV network.

15. The system of claim 1 wherein the first device forms part of the CATV tap.

16. The system of claim 1 wherein the CATV tap comprises CATV ports, and the CATV gateway device is operably coupled to the CATV tap through one of the CATV ports.

17. A cable television (CATV) tap comprising:
a tap transceiver configured to operably couple to a CATV gateway device in communication with a CATV network, the tap transceiver being located within the CATV tap, and the CATV gateway device being located outside the CATV tap;
wherein the tap transceiver and the gateway device communicate directly over a coaxial cable using a transceiver frequency band that is non-overlapping with a frequency band used to send CATV signals over the CATV network; and
wherein a first device is configured to send or receive the device data, the device data comprising:
control data for controlling the first device; or
monitoring data generated by the first device; and
wherein the tap transceiver of the CATV tap is configured to communicate the device data between the first device and the gateway transceiver.

18. The tap of claim 17 wherein the CATV gateway device uses a Data Over Cable Interface Specification (DOCSIS) communications standard to communicate with the CATV network.

19. A method comprising:
operably coupling a cable television (CATV) tap to a CATV network, the CATV tap comprising a tap transceiver located within the CATV tap;
operably coupling a CATV gateway device outside the CATV tap to the CATV tap, the CATV gateway device comprising:
a gateway modem using a first communications standard to communicate with the CATV network; and
a gateway transceiver operably coupled to the gateway modem and configured to be in direct and active communication with the tap transceiver over a coaxial cable;
operably coupling a first device to the CATV tap, the first device configured to send or receive device data, the device data comprising control data for controlling the first device or monitoring data generated by the first device; and
via the tap transceiver of the CATV tap, communicating the device data between the first device and the gateway transceiver.

* * * * *